United States Patent

Kagawa et al.

[11] Patent Number: 5,978,721
[45] Date of Patent: *Nov. 2, 1999

[54] STEERING CONTROL APPARATUS UTILIZING A HYSTERESIS CONTROL OF A STEERING TORQUE

[75] Inventors: Kazunori Kagawa, Odawara; Hiroaki Tanaka, Toyota, both of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,755

[22] Filed: Sep. 30, 1996

[30] Foreign Application Priority Data

Dec. 11, 1995 [JP] Japan ................................ 7-321779

[51] Int. Cl.⁶ ..................................................... B62D 5/04
[52] U.S. Cl. ............................. 701/41; 701/42; 180/443
[58] Field of Search ................................ 701/41, 42, 43; 180/442, 443, 446, 412, 417, 422, 423

[56] References Cited

U.S. PATENT DOCUMENTS

| 4,800,975 | 1/1989 | Oshita et al. ............................ 701/41 |
| 4,875,541 | 10/1989 | Oshita et al. .......................... 180/446 |
| 5,182,711 | 1/1993 | Takahashi et al. ....................... 701/41 |
| 5,208,752 | 5/1993 | Kodama et al. ........................ 180/422 |
| 5,236,056 | 8/1993 | Pfeffer et al. ........................... 180/446 |
| 5,513,720 | 5/1996 | Yamamoto et al. .................... 180/421 |
| 5,592,252 | 1/1997 | Shimizu et al. ........................ 318/432 |
| 5,612,877 | 3/1997 | Shimizu et al. .......................... 701/41 |
| 5,698,956 | 12/1997 | Nishino et al. ........................ 318/432 |

FOREIGN PATENT DOCUMENTS

| 0 238 348 | 9/1987 | European Pat. Off. . |
| 0 671 310 A1 | 9/1995 | European Pat. Off. . |
| 2 579 547 | 10/1986 | France . |
| Y2-2-45109 | 11/1990 | Japan . |

Primary Examiner—Tan Nguyen
Attorney, Agent, or Firm—Oliff & Berridge, PLLC

[57] ABSTRACT

A steering control apparatus which controls an amount of assist to a power assist mechanism so as to improve a steering characteristic of a vehicle. A steering torque detecting unit detects a steering torque transmitted to a steering mechanism and outputs a detection signal corresponding to the detected steering torque. An amount of assistance provided to the steering effort is controlled by a control unit based on the detection signal supplied by the steering torque detecting unit. The detection signal transmitted to the controlling unit is adjusted by an adjusting unit so that a hysteresis characteristic is provided to a relationship between a steering wheel torque applied to a steering wheel and the steering torque transmitted to the steering mechanism.

12 Claims, 6 Drawing Sheets

STEERING CONTROL APPARATUS UTILIZING A HYSTERESIS CONTROL OF A STEERING TORQUE

BACKGROUND OF THE INVENTION

1. Field of the Invention

The present invention relates to a steering control apparatus for a vehicle and, more particularly, to a steering control apparatus having an electrically operated power steering apparatus.

2. Description of the Related Art

A conventional steering control apparatus, which is provided with a power steering mechanism for assisting steering effort, comprises a steering apparatus transmitting a motion of a steering wheel to a rotary valve via an input shaft, a torsion bar and an output shaft. The rotary valve selectively directs a hydraulic pressure generated by an oil pump to power cylinders so as to reduce a steering effort applied to the steering wheel.

Such a conventional steering apparatus includes a valve control mechanism which reduces rigidity of steering gears such as a torsion bar. This causes a problem that a rigid feeling at or near a neutral position of the steering wheel is reduced. In order to solve this problem, Japanese Utility Model Publication No. 2-45109 suggests a steering apparatus which provides a preset load to a torsion bar at a neutral position by using a spring. The steering apparatus disclosed in the above-mentioned patent publication is of a rotary valve type, and has an input shaft formed with a V-shaped groove. A portion of an output shaft surrounding the input shaft has a through opening aligning with the V-shaped groove formed on the input shaft. A ball is provided in the through opening of the output shaft. The ball is urged to the V-shaped groove by an annular spring so that a preset pressure is provided to a torsion bar at a neutral position.

The above-mentioned conventional steering apparatus can provide a rigid feeling at the neutral position by providing a preset pressure to the torsion bar at the neutral position. Thus, straight line stability of a vehicle is improved.

However, in the above-mentioned conventional steering apparatus for a vehicle, no consideration is given to hysteresis between a steering torque and a valve angle formed between a valve housing and a rotary valve. Thus, a magnitude of such hysteresis cannot be controlled to an optimum level.

Recently, a steering apparatus has been suggested which uses an electrically operated power assisting mechanism having a power unit such as an electric motor instead of the above-mentioned hydraulically operated power assisting mechanism. However, the above-mentioned hysteresis is also not considered for the steering apparatus having the electrically operated power steering mechanism. Thus, neither the steering apparatus having the electrically operated power steering mechanism nor the steering apparatus having the hydraulically operated power steering mechanism can provide an optimum steering characteristic.

SUMMARY OF THE INVENTION

It is a general object of the present invention to provide an improved and useful steering control apparatus in which the above-mentioned problems are eliminated.

A more specific object of the present invention is to provide a steering control apparatus which controls an amount of assist to a power assist mechanism so as to improve a steering characteristic of a vehicle.

In order to achieve the above mentioned objects, there is provided according to the present invention a steering control apparatus for a vehicle having a power assist mechanism for assisting steering effort, the steering control apparatus comprising:

a steering torque detecting unit for detecting a steering torque transmitted to a steering mechanism and outputting a detection signal corresponding to the detected steering torque;

a controlling unit for controlling an amount of assistance provided to the steering effort based on the detection signal supplied by the steering torque detecting unit; and an adjusting unit for adjusting the detection signal transmitted to the controlling unit so that a hysteresis characteristic is provided to a relationship between a steering wheel torque applied to a steering wheel and the steering torque transmitted to the steering mechanism.

According to the present invention, the detection signal output from the steering torque detecting unit is supplied to the controlling unit after the detection signal is adjusted or varied to provide the hysteresis characteristic to the steering torque. Thus, the hysteresis characteristic of the power assist mechanism can be optimized in response to a steering operation.

In one embodiment according to the present invention, the adjusting unit may adjust the detection signal so that a hysteresis width is varied based on a level of the detection signal output from the steering torque detecting unit. Thus, a quick return of the steering wheel can be achieved adjacent to the neutral position. Additionally, the steering torque can be reduced during a maintained steering operation.

The hysteresis width may be increased as the level of the detection signal is increased. The hysteresis width is determined based on a relationship between the hysteresis width and a level of the steering torque.

Additionally, the steering control apparatus according to the present invention may further comprise a vehicle speed detecting unit for detecting vehicle speed so that the hysteresis width is varied based on the detected vehicle speed and the level of the detection signal output from the steering torque detecting unit.

According to this invention, since the hysteresis width is varied based on the detected vehicle speed, the hysteresis width can be varied based on the vehicle speed. Thus, the a steering response at a slow speed response and a steering feel at a high speed can be improved simultaneously.

The hysteresis width may be varied based on a reference hysteresis width obtained by multiplication of a vehicle speed factor and the detection signal, the vehicle speed factor obtained from the vehicle speed.

Additionally, the steering control apparatus according to the present invention may further comprise a steering angle detecting unit for detecting a steering angle so that the hysteresis width is varied based on the detected steering angle. The hysteresis width may be increased as the steering angle is increased.

Other objects, features and advantages of the present invention will become more apparent from the following detailed description when read in conjunction with the accompanying drawings.

DETAILED DESCRIPTION OF THE PREFERRED EMBODIMENT

Figure 1:
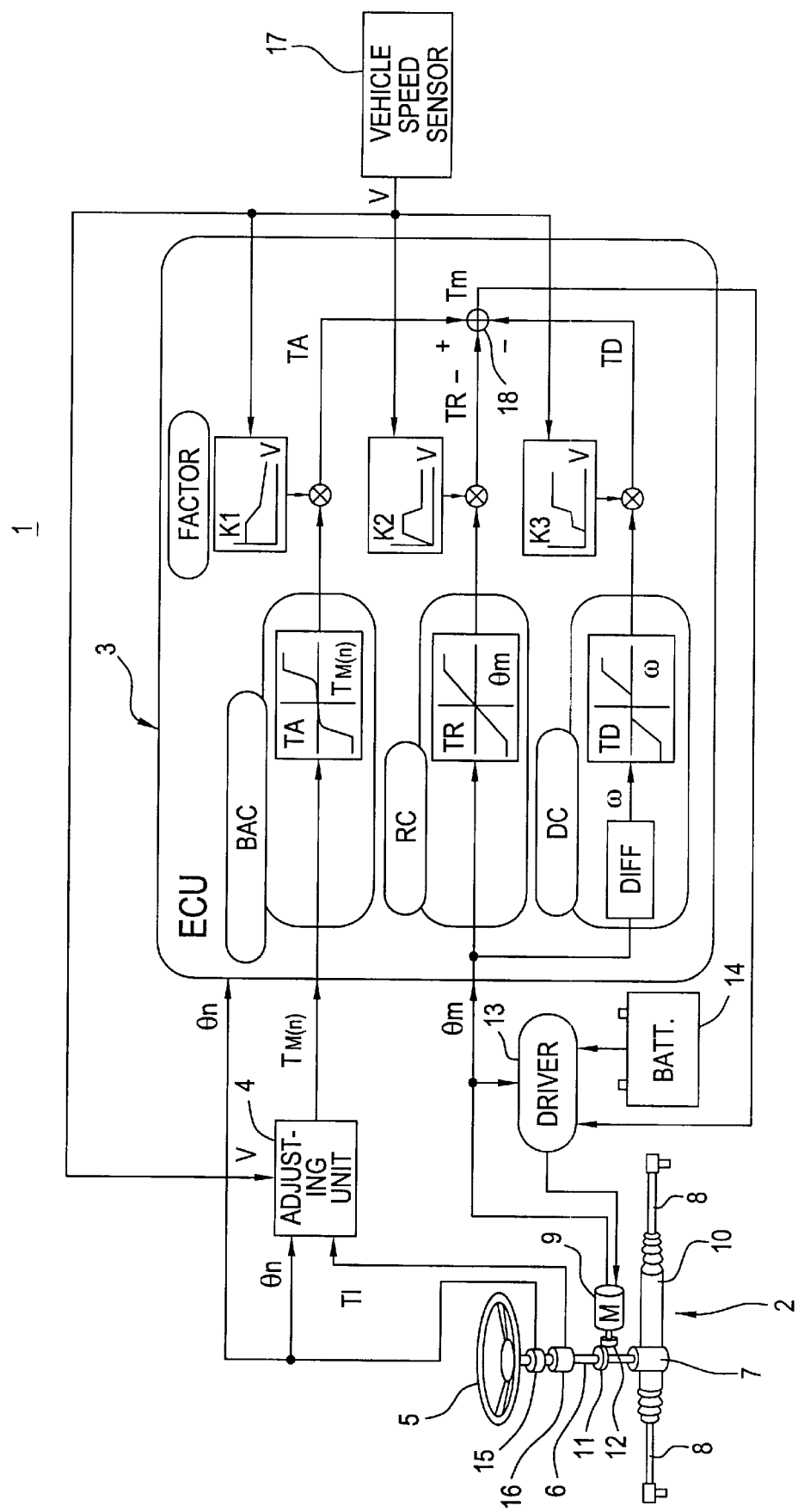
FIG. 1 is an illustration of a structure of a steering control apparatus for a vehicle according to the first embodiment of the present invention.

A description will now be given of a first embodiment of the present invention. FIG. 1 is an illustration of a structure of a steering control apparatus 1 for a vehicle according to the first embodiment of the present invention.

The steering control apparatus 1 generally comprises a steering apparatus 2, an electronic control unit 3 (hereinafter referred to as an ECU 3) for a power steering mechanism, and an adjusting unit 4.

The steering apparatus 2 uses a rack and pinion mechanism. The steering apparatus 2 generally comprises a steering wheel 5, a steering shaft 6, a gear box 7, a rack bar 8 and a power assist motor 9.

The steering wheel 5 is provided on an upper end of the steering shaft 6. A lower end of the steering shaft 6 is connected to the gear box 7. The gear box 7 is provided with a pinion (not shown in the figure) which is coupled to the steering shaft 6. The pinion engages with a rack gear formed on the rack bar 8 in the gear box 7. Thus, when the steering wheel 5 is turned, a steering torque is transmitted to the pinion via the steering shaft 6. Thus, the rack bar is moved in either of the directions X1 or X2 shown by an arrow. Additionally, wheels are provided on opposite ends of the rack bar 8. Thus, the orientation of the wheels is controlled by moving the rack bar either in the X1 direction or the X2 direction. It should be noted that the rack bar 8 is accommodated in a rack body 10 extending from the gear box 7.

A gear 11 is provided on a steering shaft 6 in a predetermined position. The gear 11 engages with a gear 12 which is provided on a drive shaft of the power assist motor 9. Thus, when the power assist motor is rotated, a driving force is transmitted to the steering shaft 6 via the gears 11 and 12 so as to assist rotation of the steering shaft.

The power assist motor 9 is driven by a driver 13 connected to the ECU 3. Thus, the operation of the power assist motor 9 is controlled by the ECU 3. The power assist motor 9 has an angle sensor which senses a rotational angle $\Theta_m$ of the drive shaft so as to send a rotational angle signal to the ECU 3. The power assist motor 9 is operated by power supplied by a battery 14.

The steering shaft 6 is provided with a steering angle sensor 15 and a torque sensor 16. The steering sensor 15 senses an amount of rotation of the steering wheel 5 which is referred to as a steering angle $\Theta_n$. The steering angle sensor 15 is connected to the ECU 3. The steering torque sensor 16 senses a torque applied to the steering shaft 6 when the steering wheel 5 is turned. The torque applied to the steering shaft 6 is referred to as a torque sensor value $T_i$.

The steering torque sensor 16 is connected to the ECU 3 via an adjusting unit 4 so that the torque sensor value $T_i$ is received first by the adjusting unit 4. The adjusting unit 4 applies a hysteresis process to the torque sensor value $T_i$, and send the processed value to the ECU 3. The hysteresis process will be described later.

Additionally, the vehicle equipped with the steering control apparatus 1 has a vehicle speed sensor 17 which senses a moving speed of the vehicle. The moving speed of the vehicle sensed by the vehicle speed sensor 17 is supplied to the ECU 3 and the adjusting unit 4 as a vehicle speed signal.

A description will now be given of a control process performed by the ECU 3. The ECU 3 comprises a microcomputer. The ECU 3 calculates an optimum motor torque $T_m$ to be generated by the power assist motor 9 based on the torque sensor value $T_i$, the steering angle $\Theta_n$ and the rotational angle $\Theta_m$ each of which is supplied by the respective sensors.

The optimum motor torque $T_m$ is supplied to the driver 13. The driver 13 then supplies a current to the power assist motor 9 so that the power assist motor 9 generates the optimum motor torque $T_m$. Thus, the optimum motor torque $T_m$ is applied to the steering shaft 6 so that the power assist for the steering effort is performed.

In the present embodiment, three controls, which include a basic assist control (BAC), a return control (RT) and a damper control (DC), are performed by the ECU 3 so as to calculate the optimum motor torque $T_m$.

In the basic assist control, the power assist motor 9 calculates a basic assist torque TA for assisting the steering effort based on the steering torque provided with the hysteresis by the adjusting unit 4 as described later. Hereinafter, the steering torque provided with the hysteresis is referred to as a adjusted steering torque $T_M(n)$. The basic assist torque TA is obtained from a two-dimensional map of the previously obtained adjusted steering torque $T_M(n)$ and the basic assist torque TA. Additionally, since the steering effort is varied according to a vehicle speed, the basic assist torque TA is corrected based on the vehicle speed V detected by the vehicle speed sensor 17 in the present embodiment.

The return control is for control of a return torque TR of the steering wheel 5. More specifically, the return torque TR is set to a small value when the steering angle is small, that is, when the steering angle of the steering wheel 5 is small. On the other hand, the return torque TR is set to a large value when the steering angle is large, that is, when the steering angle of the steering wheel 5 is large. This control is performed so as to provide an appropriate return of the steering wheel 5.

In the present embodiment, the return torque TR is calculated based on the rotational angle $\Theta_m$ which is output from the rotational angle sensor provided in the power assist motor 9. More specifically, the return torque TR is obtained by a two-dimensional map of the rotational angle $\Theta_m$ and the return torque TR. The two-dimensional map is stored in the ECU 3 in advance. The returning force of the steering wheel 5 is also varied according to the vehicle speed. Thus, the return torque TR is also corrected based on the vehicle speed V detected by the vehicle speed sensor 17 in the present embodiment.

Further, the damper control is performed so as to limit the rotation of the steering wheel 5 due to inertia generated in the steering apparatus. That is, if the steering wheel 5 is turned at a high speed, an inertia is generated in the steering wheel 5. This results in a phenomenon in which the steering wheel cannot be stopped immediately after the steering effort to the steering wheel 5 is released. If this phenomenon occurs, the steering operation of the vehicle becomes unstable.

To this end, in the damper control, a damper torque TD is provided to the steering shaft 6 so as to prevent the movement of the steering wheel 5 due to the generation of inertia in the steering wheel 5. Specifically, the rotational speed (w=d$\Theta_m$/dt) of the steering wheel 5 is calculated by differentiating the rotational angle $\Theta_m$ output from the angle sensor provided in the power assist motor 9. The damper torque TD is calculated based on the rotational speed w.

The damper torque TD is obtained by a two-dimensional map of the rotational speed w and the damper torque TD. The two-dimensional map is stored in the ECU 3 in advance. Since the inertia generated in the steering wheel 5 is varied according to the vehicle speed, the damper torque TD is also corrected based on the vehicle speed V detected by the vehicle speed sensor 17 in the present embodiment.

In the present embodiment, the value of the optimum motor torque $T_m$ is calculated by a coupling element 18 which couples the basic assist torque TA, the return torque TR and the damper torque TD. In this process, the optimum motor torque $T_m$ is obtained by the relationship $T_m$=(TA−TR−TD).

As mentioned-above, the value of the optimum motor torque $T_m$ calculated by the ECU 3 is supplied to the driver 13. The driver 13 then supplies the current for generating the optimum motor torque $T_m$ to the power assist motor 9.

In the steering control apparatus 1 according to the present embodiment, the steering torque detected by the steering torque sensor 16 is not directly supplied to the ECU 3 but supplied to the ECU 3 after the hysteresis characteristic is provided. This is to perform a hysteresis control of the steering operation.

A description will now be given of the hysteresis control performed by the adjusting unit 4. In the hysteresis control, the hysteresis characteristic is provided to the torque sensor value $T_i$ which is a value of torque applied to the steering shaft 6. This process is performed by the adjusting unit 4, and referred to as an adjusting process.

Figure 2:
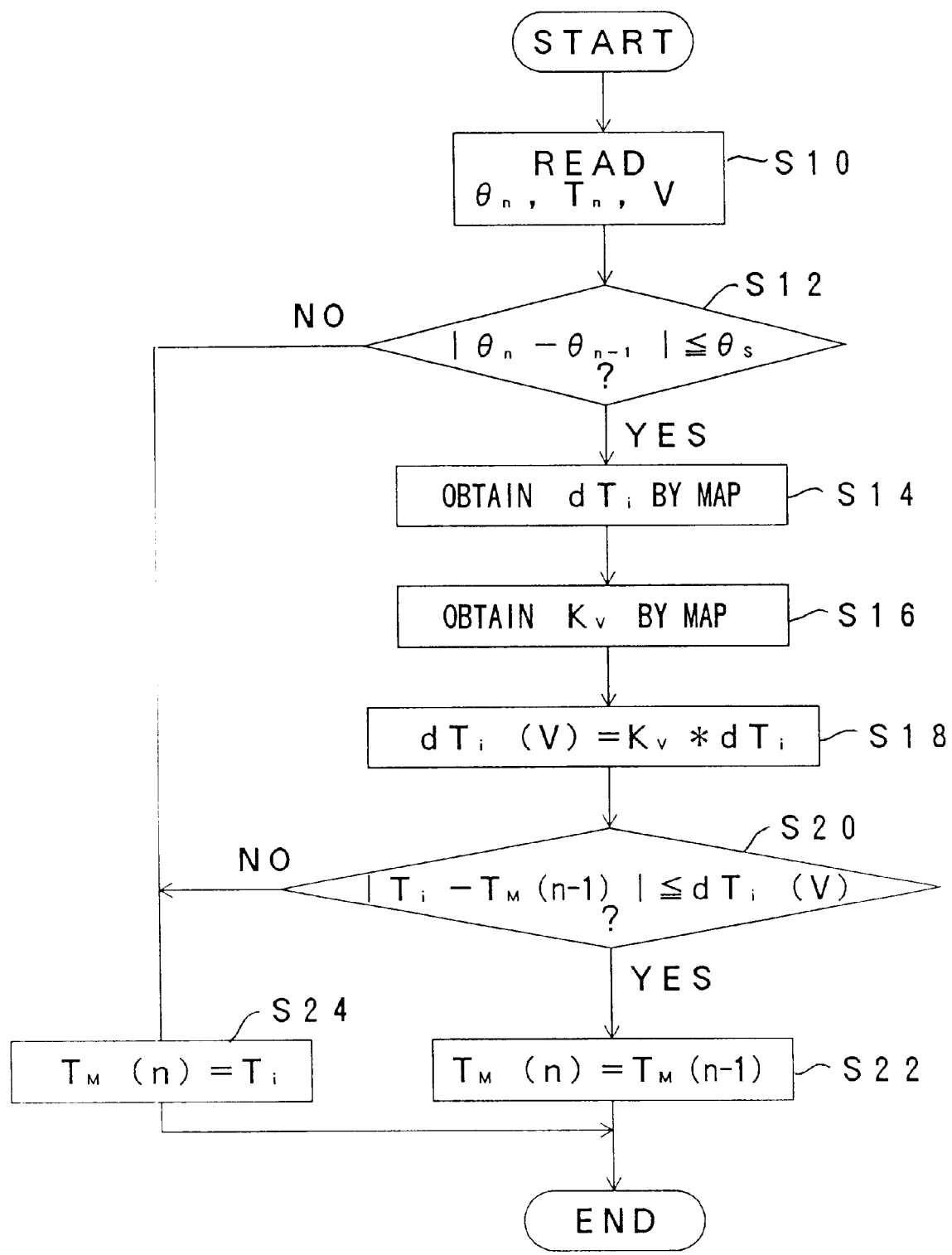
FIG. 2 is a flowchart of an adjusting process performed by an adjusting unit shown in FIG. 1.

FIG. 2 is a flowchart of the adjusting process performed by the adjusting unit 4. The adjusting process is started when the engine of the vehicle is started, and periodically performed at a predetermined interval while the engine is operated.

When the process shown in FIG. 2 is started, the steering angle $\Theta_n$, the torque sensor value $T_i$ and the vehicle speed V are read in step S10. The steering angle $\Theta_n$ is output from the steering angle sensor 15. The torque sensor value is output from the steering torque sensor 16. The vehicle speed V is output from the vehicle speed sensor 17.

In step S12, it is determined whether or not the difference between the steering angle $\Theta_n$ and the steering angle $\Theta_{n-1}$ is equal to or less than a predetermined angle $\Theta_s$, where $\Theta_n$ is the steering angle obtained at the current process and $\Theta_{n-1}$ is the steering angle obtained at the last process. That is, it is determined, in step S12, whether or not the absolute value ($|\Theta_n-\Theta_{n-1}|$) is equal to or less than the predetermined angle $\Theta_s$. The process of step S12 is performed to determine whether a steering operation is being performed. If the absolute value ($|\Theta_n-\Theta_{n-1}|$) is equal to or less than the predetermined angle $\Theta_s$, it can be determined that the steering wheel 5 is maintained at the same position to maintain the steering angle. This state is referred to as a maintained steering state.

Figure 3:
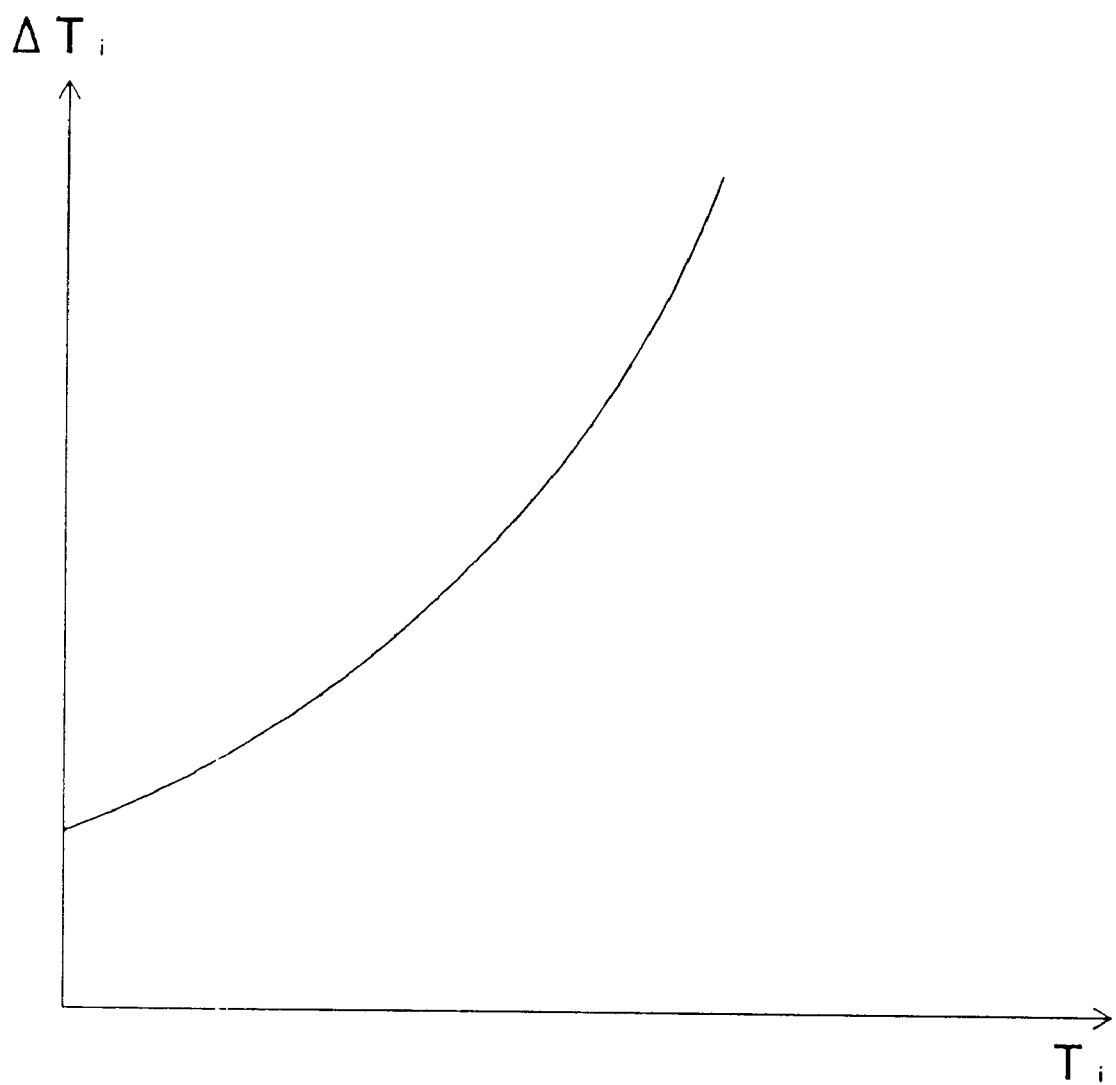
FIG. 3 is a graph representing a relationship between a hysteresis width and a torque sensor value.

If it is determined, in step S12, that the absolute value ($|\Theta_n-\Theta_{n-1}|$) is equal to or less than the predetermined angle $\Theta_s$, the routine proceeds to step S14. In step S14, a hysteresis width $dT_i$ is obtained based on the torque sensor value $T_i$ which is read in step S10. The relationship between the hysteresis width $dT_i$ and the torque sensor value $T_i$ is stored as a two-dimensional map representing a graph shown in FIG. 3. Thus, the hysteresis width $dT_i$ corresponding to the current torque sensor value $T_i$ can be determined by referring to the two-dimensional map.

In step S16, a vehicle speed factor $K_v$ is obtained. The relationship between the vehicle speed V and the vehicle speed factor $K_v$ is stored as a two-dimensional map representing a graph shown in FIG. 4. Thus, the vehicle speed factor $K_v$ corresponding to the current vehicle speed V can be determined by referring to the two-dimensional map.

In step S18, a hysteresis width $dT_i(V)$ to which the vehicle speed is reflected is calculated by multiplying the hysteresis width $dT_i$ obtained in step S14 by the vehicle speed factor $K_v$ obtained in step S16. The hysteresis width $dT_i(V)$ is hereinafter referred to as a reference hysteresis width $dT_i(V)$.

After the reference hysteresis width $dT_i(V)$ is calculated, the routine proceeds to step S20. In step S20, it is determined whether or not the difference between the torque sensor value $T_i$ obtained in step S10 of the current adjusting process and the torque sensor value $T_M(n-1)$ obtained in the last adjusting process is equal to or less than the reference hysteresis width $dT_i(V)$. That is, it is determined, in step S20, whether or not the absolute value ($|T_i-T_M(n-1)|$) is equal to or less than the reference hysteresis width $dT_i(V)$ calculated in the current adjusting process. The absolute value process of step S12 is performed to determine whether a steering operation is being performed. The difference ($|T_i-T_M(n-1)|$) corresponds to a hysteresis width in the torque value between the last adjusting process and the current adjusting process.

If it is determined, in step S20, that the hysteresis width ($|T_i-T_M(n-1)|$) is equal to or less than the reference hysteresis width $dT_i$, the routine proceeds to step S22. In step S22, the adjusted steering torque $T_M(n)$ obtained in the current adjusting process is substituted by the adjusted steering torque $T_M(n-1)$ obtained in the last adjusting process, and the routine is ended.

On the other hand, if it is determined, in step S20, that the hysteresis width ($|T_i-T_M(n-1)|$) is greater than the reference hysteresis width $dT_i$, the routine proceeds to step S24. In step S24, the adjusted steering torque $T_M(n)$ obtained in the current adjusting process is substituted by the torque sensor value $T_i$ obtained in step S10 of the current adjusting process, and the routine is ended.

As mentioned above, if it is determined that the vehicle is in the maintained steering state and that the hysteresis width ($|T_i-T_M(n-1)|$) is equal to or less than the reference hysteresis width $dT_i(V)$ (this condition may happen when the steering wheel 5 is in the neutral position), the adjusted steering torque $T_M(n)$ obtained in the current adjusting process is substituted, in step S22, by the adjusted steering torque $T_M(n-1)$ obtained in the last adjusting process.

On the other hand, if it is determined that the vehicle is not in the maintained steering state and that the hysteresis width ($|T_i-T_M(n-1)|$) is greater than the reference hysteresis width $dT_i(V)$, the adjusted steering torque $T_M(n)$ obtained in the current adjusting process is substituted, in step S24, by the torque sensor value $T_i$ obtained in step S10 of the current adjusting process.

After the process of step S22 or S24 is completed, the adjusted steering torque $T_M(n)$ obtained in the step S22 or S24 is sent to the ECU 3. Then, the basic assist control is performed based on the adjusted steering torque $T_M(n)$ obtained in the current adjusting process.

Figure 5:
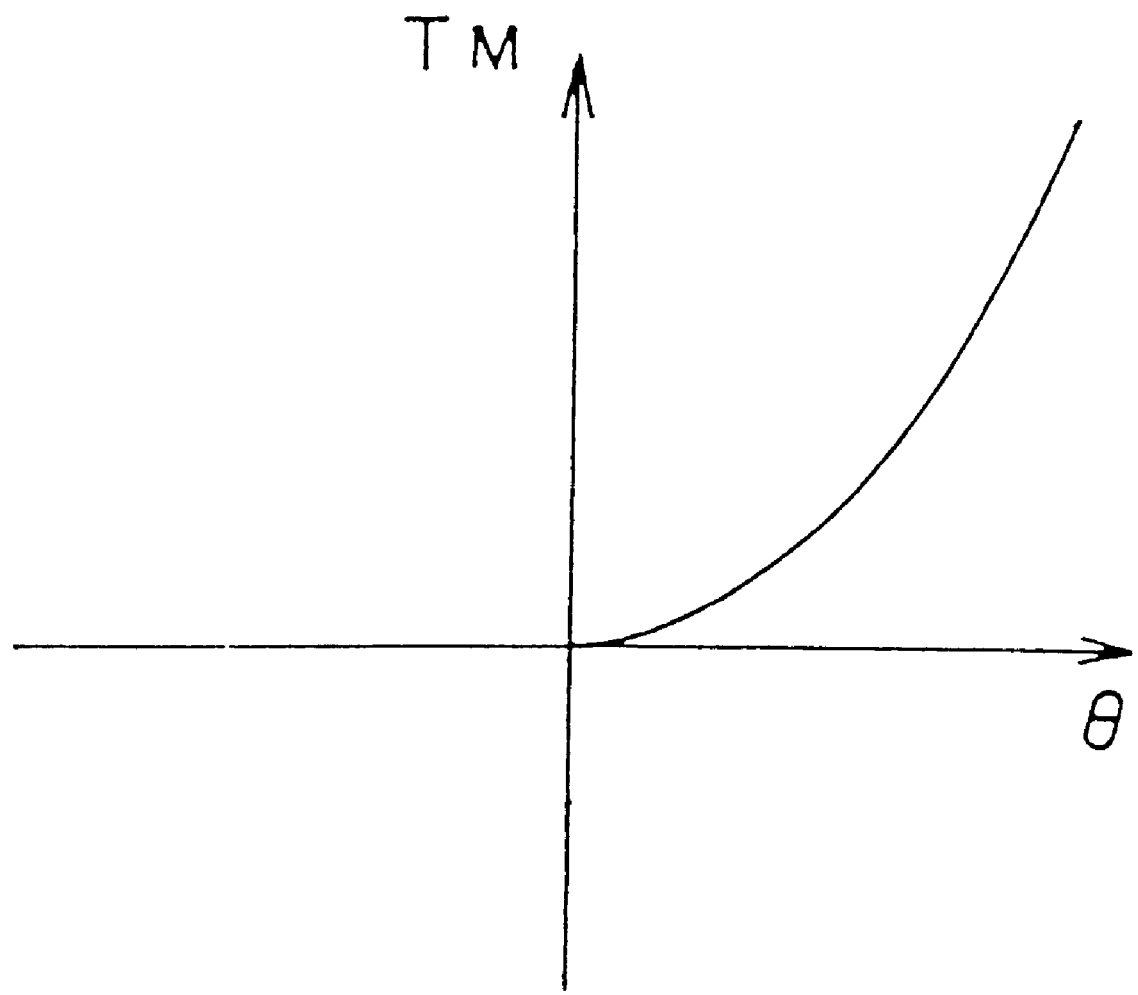
FIG. 5 is a graph representing a relationship between a steering angle and a steering torque.
Figure 6:
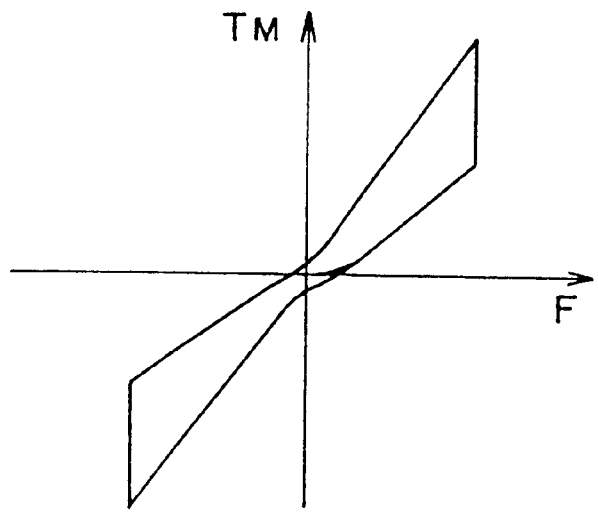
FIG. 6 is a graph representing a characteristic in a relationship between a steering torque and an axial force applied to a steering shaft.

FIG. 5 is a graph showing a relationship between the steering angle $\Theta$ and the steering torque $T_M$. As shown in FIG. 5, the steering torque $T_M$ is increased as the steering angle $\Theta_n$ is increased. Consequently, the hysteresis width $T_i$ is also increased. Thus, a relationship between an axial force F which corresponds to a steering wheel torque provided to the steering wheel 5 and the steering torque $T_M$ generated in the steering shaft 6 exhibits a hysteresis characteristic (hereinafter referred to as $T_M$-F characteristic) shown by a graph of FIG. 6 when the basic assist control is performed based on the adjusted steering torque $T_M(n)$ obtained by the adjusting process of FIG. 2.

Accordingly, in an area adjacent to the neutral position where the steering torque is small, a quick returning response of the steering wheel 5 is achieved. Additionally, since a large hysteresis is generated in a turning condition where the steering torque $T_M$ is large (the steering angle $\Theta_n$ is large), the steering torque can be reduced in the maintained steering state, and undesirable zigzag movement of the vehicle can be prevented.

Figure 4:
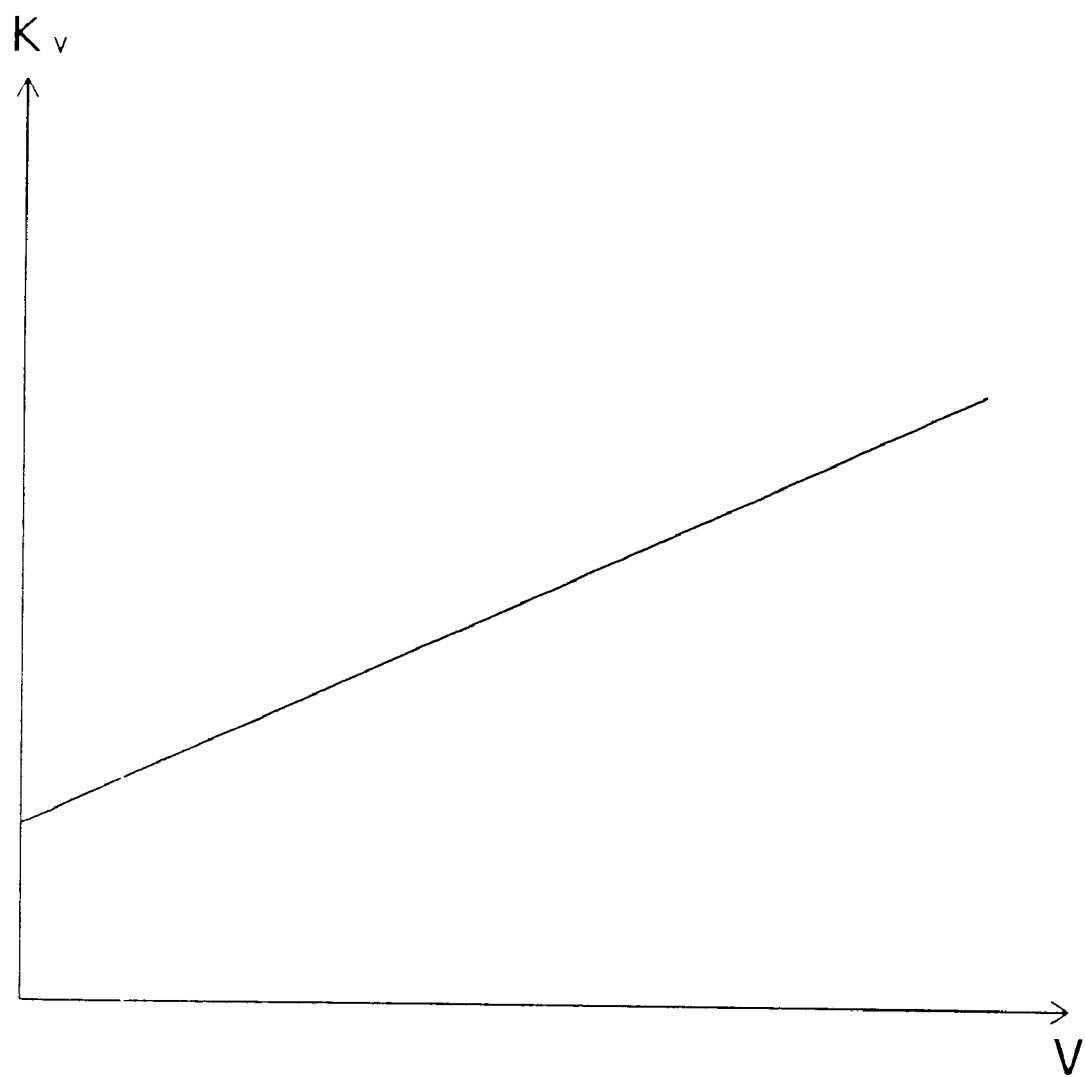
FIG. 4 is a graph representing a relationship between vehicle speed and a vehicle speed factor.
Figure 7:
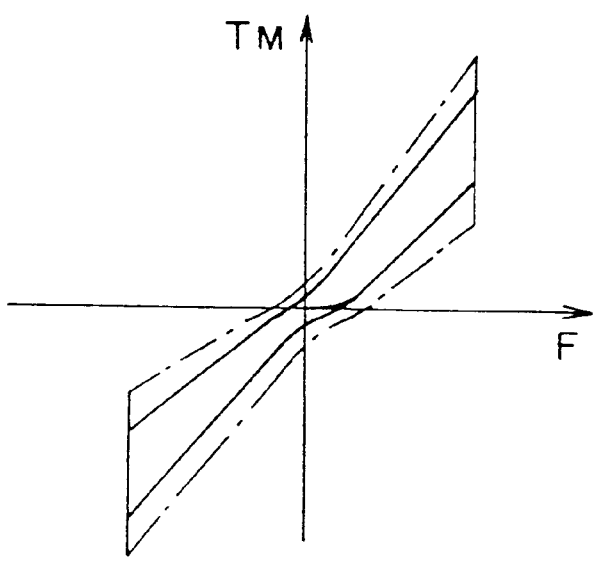
FIG. 7 is a graph representing a characteristic in a relationship between a steering torque and an axial force applied to a steering wheel in the first embodiment according to the present invention.

Additionally, in the present embodiment, since the vehicle speed factor $K_v$ is increased as the vehicle speed is increased as shown in FIG. 4, the $T_M$-F characteristic can be varied in accordance with the variation in the vehicle speed V. More specifically, the hysteresis in the $T_M$-F characteristics may be reduced during a low speed operation as shown by solid lines in FIG. 7, and the hysteresis may be increased during a high speed operation as shown by chain lines. It should be noted that the solid lines indicate the $T_M$-F characteristic when the vehicle is moving at V=20 km/h, and the chain lines indicate the $T_M$-F characteristic when the vehicle is moving at V=100 km/h.

Generally, in a normal 2-wheel steering vehicle, the hysteresis in the $T_M$-F characteristic is reduced as the vehicle speed is increased, and a direction of the hysteresis loop is reversed at a certain speed. Thus, if the hysteresis in the $T_M$-F characteristic is not variable, the hysteresis in the $T_M$-F characteristic is reduced as the vehicle speed is increased. This causes a decrease in a responsive feel of the steering operation, resulting in deterioration in the steering feel.

However, as discussed above, since the hysteresis in the $T_M$-F characteristic can be increased when the vehicle is moving at a high speed in the present embodiment, the deterioration in the response feel in the steering operation during a high speed operation can be prevented, resulting in an improvement in the steering feel especially for the 2-wheel steering vehicle.

The present invention is not limited to the specifically disclosed embodiments, and variations and modifications may be made without departing from the scope of the present invention.

What is claimed is:

1. A steering control apparatus for a vehicle having a power steering mechanism which assists a steering torque applied to a steering shaft via a steering wheel, the steering control apparatus comprising:
   a steering torque detecting unit for detecting the steering torque applied to the steering shaft, the steering torque corresponding to a current adjusting torque sensor value;
   a control unit for controlling an amount of assistance provided to the steering torque based on the steering torque detected by the steering torque detecting unit; and
   an adjusting unit for providing a hysteresis to a relationship between the steering torque and the amount of assistance based on a hysteresis width of the hysteresis, the hysteresis width corresponding to an absolute value of a difference between the current adjusting torque sensor value and a previous adjusting torque sensor value detected by the steering torque detecting unit such that the previous adjusting torque sensor value is used as an adjusted steering torque when the hysteresis width is equal to or less than a reference hysteresis width and the current adjusting torque sensor value is used as the adjusted steering torque when the hysteresis width is greater than the reference hysteresis width, the adjusting unit increasing the hysteresis width of the hysteresis in response to an increase in an absolute value of the steering torque detected by the steering torque detecting unit.

2. The steering control apparatus according to claim 1, wherein the steering torque detecting unit outputs a detection signal corresponding to the detected steering torque, the adjusting unit provides the hysteresis to the detection signal and supplies the detection signal having the hysteresis to the control unit.

3. The steering control apparatus according to claim 1, wherein the hysteresis width is determined based on a predetermined relationship between the hysteresis width and the steering torque.

4. A steering control apparatus for a vehicle having a power steering mechanism which assists a steering torque applied to a steering shaft via a steering wheel, the steering control apparatus comprising:
   a steering torque detecting unit for detecting the steering torque applied to the steering shaft, the steering torque corresponding to a current adjusting torque sensor value;
   a control unit for controlling an amount of assistance provided to the steering torque based on the steering torque detected by the steering torque detecting unit;
   a vehicle speed detecting unit torque detecting a vehicle speed; and
   an adjusting unit for providing a hysteresis to a relationship between the steering torque and the amount of assistance based on a hysteresis width of tho hysteresis, the hysteresis width corresponding to an absolute value of a difference between the current adjusting torque sensor value and a previous adjusting torque sensor value detected by the steering torque detecting unit such that the previous adjusting torque sensor value is used as an adjusted steering torque when the hysteresis width is equal to or less than a reference hysteresis width and the current adjusting torque sensor value is used as the adjusted steering torque when the hysteresis width is greater than the reference hysteresis width, the adjusting unit varying the hysteresis width of the hysteresis based on the vehicle speed detected by the vehicle speed detecting unit.

5. The steering apparatus according to claim 4, wherein the steering torque detecting unit outputs a detection signal corresponding to the detected steering torque, the adjusting unit provides the hysteresis to the detection signal and supplies the detection signal having the hysteresis to the control unit.

6. The steering control apparatus according to claim 4, wherein the hysteresis width is increased as steering torque detected by the steering torque detecting unit is increased.

7. The steering control apparatus according to claim 4, wherein the hysteresis width is increased as the vehicle speed detected by the vehicle speed detecting unit is increased.

8. The steering control apparatus according to claim 4, wherein the hysteresis width is varied based on the reference hysteresis width obtained by a multiplication of a vehicle speed factor and a detection signal, the vehicle speed factor obtained from the vehicle speed, the detection signal corresponding to the steering torque and being output from the steering torque detecting unit.

9. A steering control apparatus for a vehicle having a power steering mechanism which assists a steering torque applied to a steering shaft via a steering wheel, the steering control apparatus comprising:

a steering torque detecting unit for detecting the steering torque applied to the steering shaft, the steering torque corresponding to a current adjusting torque sensor value;

a control unit for controlling an amount of assistance provided to the steering torque based on the steering torque detected by the steering torque detecting unit;

a steering angle detecting unit for detecting a steering angle of the steering wheel; and an adjusting unit for providing a hysteresis to a relationship between the steering torque and the amount of assistance based on a hysteresis width of the hysteresis, the hysteresis width corresponding to absolute value of a difference between the current adjusting torque sensor value and a previous adjusting torque sensor value detected by the steering torque detecting unit such that the previous adjusting torque sensor value is used as an adjusted steering torque when the hysteresis width is equal to or less than a reference hysteresis width and the current adjusting torque sensor value is used as the adjusted steering torque when the hysteresis width is greater than the reference hysteresis width, the adjusting unit varying the hysteresis width of the hysteresis based on the steering angle detected by the steering angle detecting unit.

10. The steering apparatus according to claim 9, wherein the steering torque detecting unit outputs a detection signal corresponding to the detected steering torque, the adjusting unit provides the hysteresis to the detection signal and supplies the detection signal having the hysteresis to the control unit.

11. The steering control apparatus according to claim 9, wherein the hysteresis width is increased as steering torque detected by the steering torque detecting unit is increased.

12. The steering control apparatus according to claim 9, wherein the hysteresis width is increased as the steering angle detected by the steering angle detecting unit is increased.

* * * * *